(12) United States Patent
Hamelink et al.

(10) Patent No.: US 6,547,308 B2
(45) Date of Patent: Apr. 15, 2003

(54) VISOR MOUNTING ASSEMBLY

(75) Inventors: L. Robert Hamelink, Holland, MI (US); Eric D. Rennie, Spring Lake, MI (US)

(73) Assignee: Johnson Controls Technology, Plymouth, MI (US)

(*) Notice: Subject to any disclaimer, the term of this patent is extended or adjusted under 35 U.S.C. 154(b) by 0 days.

(21) Appl. No.: 09/754,494

(22) Filed: Jan. 4, 2001

(65) Prior Publication Data

US 2002/0084670 A1 Jul. 4, 2002

(51) Int. Cl.⁷ .................................................. B60J 3/00
(52) U.S. Cl. .................. 296/97.9; 296/97.4; 296/97.12; 296/97.13; 280/730.2; 248/289.11; 248/291.1
(58) Field of Search ............................. 296/97.4, 97.9, 296/97.12, 97.13; 280/730.2, 730.1; 248/289.11, 291.1

(56) References Cited

U.S. PATENT DOCUMENTS

| | | | |
|---|---|---|---|
| 4,500,131 A | 2/1985 | Fleming | 296/97 |
| 4,569,552 A | 2/1986 | Marks | 296/97 |
| 4,729,590 A | 3/1988 | Adams | 296/97 |
| 4,762,359 A | 8/1988 | Boerema et al. | 296/97 |
| 5,230,546 A * | 7/1993 | Smith et al. | 296/97.5 |
| 5,685,629 A | 11/1997 | Hemmeke et al. | 362/140 |
| 5,765,897 A | 6/1998 | Snyder et al. | 296/97.9 |
| 5,820,197 A | 10/1998 | Lanser | 296/97.12 |
| 5,857,728 A * | 1/1999 | Crotty, III | 296/97.9 |
| 6,003,928 A * | 12/1999 | Curtindale | 296/97.9 |
| 6,068,323 A * | 5/2000 | Brown et al. | 296/97.9 |
| 6,250,708 B1 * | 6/2001 | Kurachi | 296/97.9 |
| 6,334,626 B2 * | 1/2002 | Nakajima et al. | 296/97.1 |

* cited by examiner

Primary Examiner—D. Glenn Dayoan
Assistant Examiner—Lori L Coletta
(74) Attorney, Agent, or Firm—Price, Heneveld, Cooper, DeWitt & Litton

(57) ABSTRACT

A visor mounting assembly includes a visor elbow and a visor mounting bracket with a cam cooperating between the two members to detent the visor when moved from a front windshield position to a side window position at a location which allows clearance of the side curtain air bag, thereby positioning the visor when in the side window position at a location which does not interfere with or inhibit the deployment of a side curtain air bag. In one embodiment, a stop extends between the elbow and bracket to limit the movement of the visor.

25 Claims, 3 Drawing Sheets

VISOR MOUNTING ASSEMBLY

BACKGROUND OF THE INVENTION

The present invention relates to vehicle visors and particularly to a mounting assembly for attaching a visor to a vehicle.

Visors are conventionally mounted to a vehicle by an elbow bracket which is secured to the sheet metal or other framework of the vehicle roof by fastening screws. The visor assembly includes a visor body into which a visor rod assembly attaches to allow the visor to rotate from a stored position adjacent the vehicle headliner to a lowered use position and subsequently rotated to the side window position for blocking incoming sunlight from either the side or the windshield by adjusting the visor's rotational position once lowered. Frequently such visor assemblies include illuminated vanity mirrors and/or accessories, such as garage door opening transmitters, memo recorders, or other electrical accessories.

With the advent of side curtain air bags which are mounted within the vehicle headliner adjacent the side window and extend downwardly when triggered, it is possible for a vehicle operator to adjust a conventional visor to a side window sun-screening position which could interfere with or inhibit the operation of a side curtain air bag.

There exists a need, therefore, for a visor mounting system which prevents or greatly reduces the possibility of misaligning a visor in a side window sun-blocking position which could interfere with the operation of a side curtain air bag.

SUMMARY OF THE INVENTION

The visor mounting assembly of the present invention provides a system in which a visor elbow is mounted to a visor mounting bracket with a cam cooperating between the two members to detent the visor when moved from a front windshield position to a side window position at a location which allows clearance of the side curtain air bag, thereby positioning the visor when in the side window position at a location which does not interfere with or inhibit the operation of a side curtain air bag.

In one embodiment of the present invention, the visor mounting assembly includes an elbow mounting bracket having one of a recess and projection which is angularly positioned to cooperate with a visor elbow supporting a visor rod, which elbow includes the other of a projection and recess. When the visor is lowered and moved from a front windshield position to a side window position, it seeks and detents in a side window position which locates the visor in a position spaced laterally from the zone of operation of a side curtain air bag if deployed. Accordingly, a visor mounting assembly of the present invention provides an improved visor mounting system by which the vehicle operator can tactically locate the visor in a safe side window sun-blocking position for use in a vehicle equipped with a side curtain air bag.

These and other features, objects and advantages of the present invention will become apparent upon reading the following description thereof together with reference to the accompanying drawings.

DETAILED DESCRIPTION OF THE PREFERRED EMBODIMENT

Figure 1:
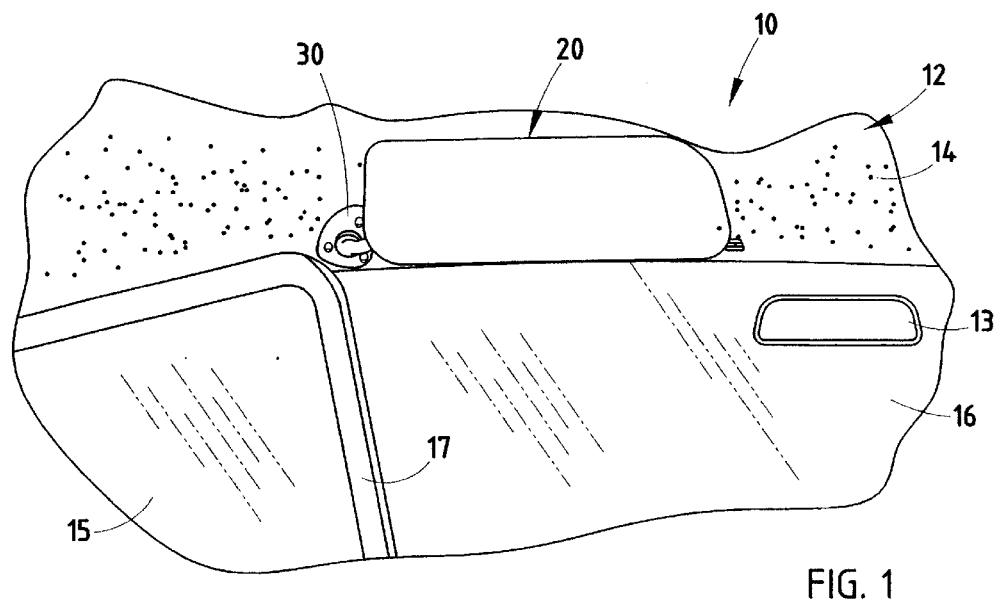
FIG. 1 is a fragmentary perspective view of a vehicle including a visor embodying the present invention, shown with the visor in a first position.
Figure 2:
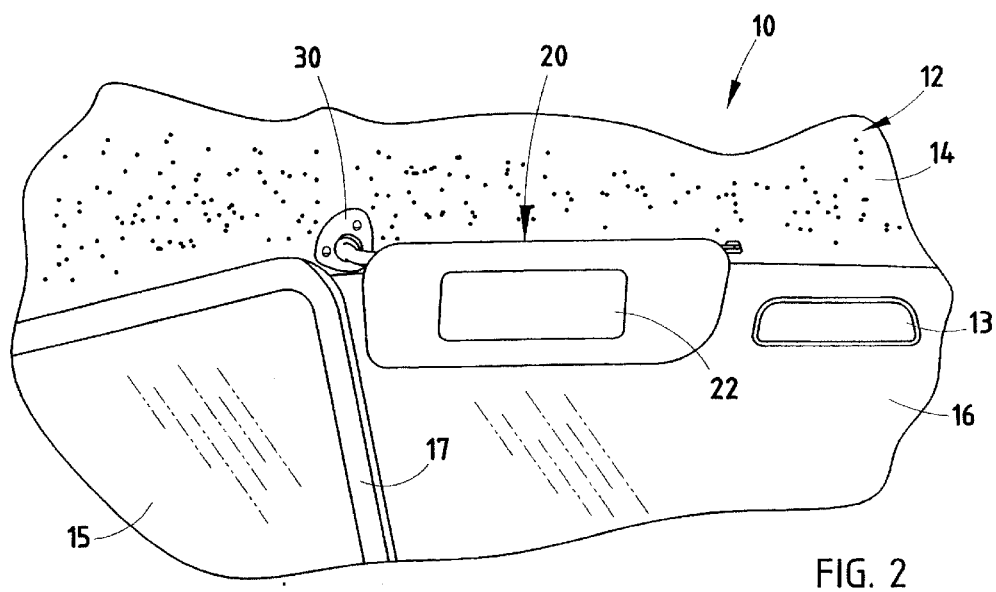
FIG. 2 is a fragmentary perspective view of a vehicle including a visor embodying the present invention, shown with the visor in a second lowered use position.
Figure 3:
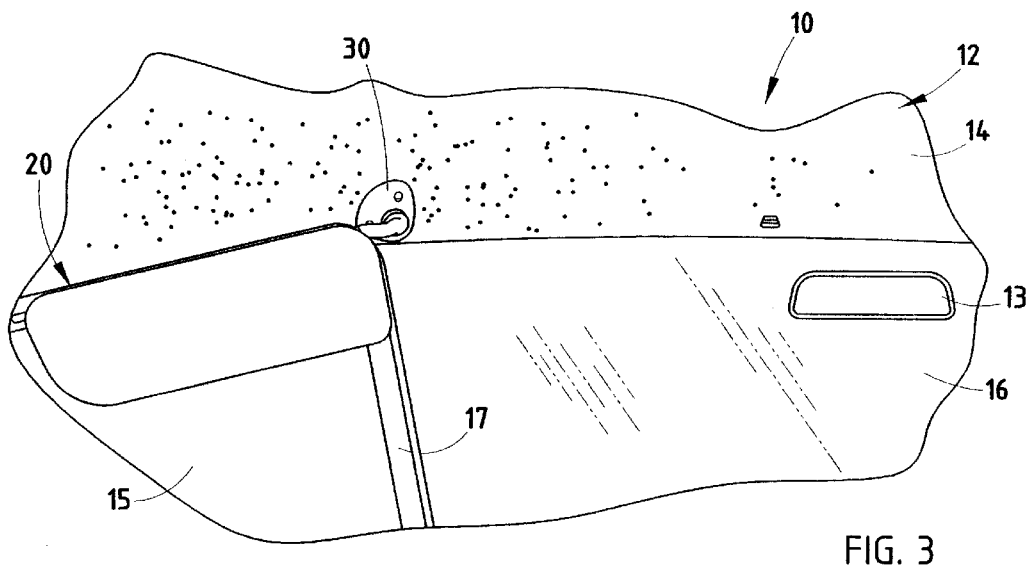
FIG. 3 is a fragmentary perspective view of a vehicle including a visor embodying the present invention, shown with the visor in a side window sun-blocking position.
Figure 5:
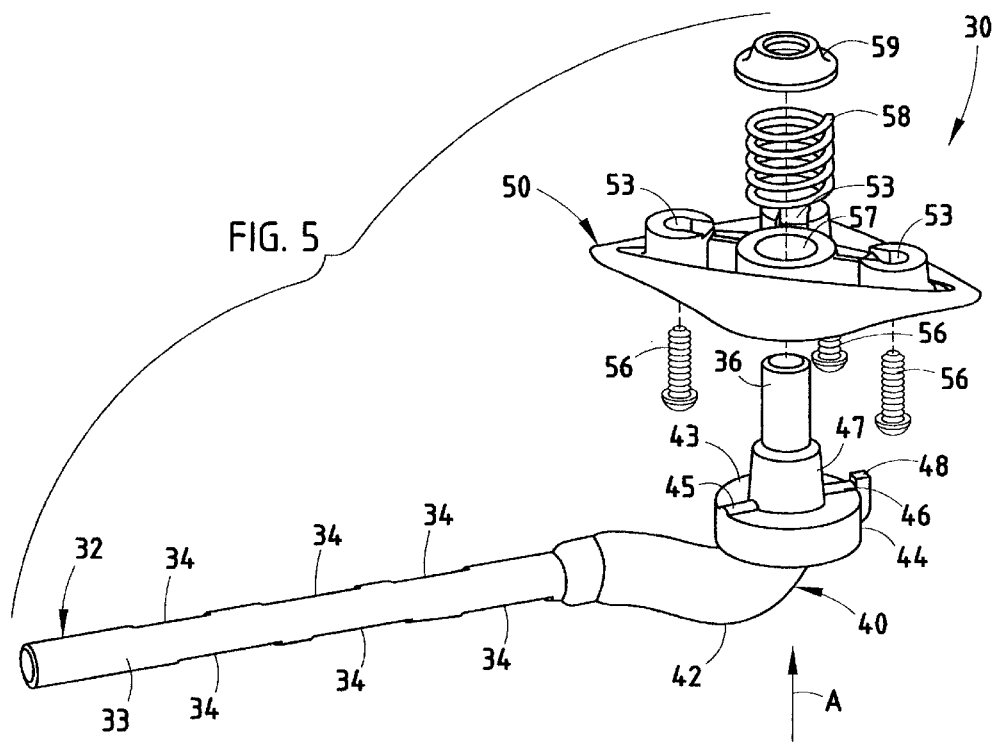
FIG. 5 is an exploded perspective view of the visor mounting assembly of the present invention.
Figure 6:
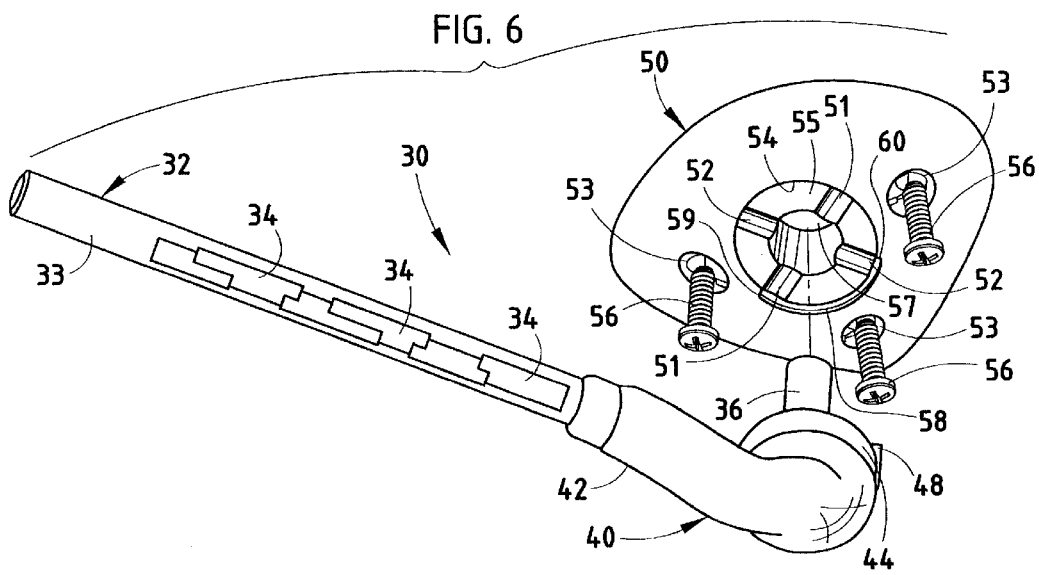
FIG. 6 is an exploded perspective view of the structure shown in FIG. 5, taken in the direction of arrow A in FIG. 5.

Referring initially to FIGS. 1–3, there is shown a vehicle 10, such as an automobile, which includes a roof 12 typically including a sheet metal support covered by a headliner 14 which can be integrally molded and attached to provide a sound absorptive and decorative interior finish to the vehicle. A visor 20 is mounted above the windshield 16 of the vehicle by means of a visor mounting assembly 30 described in greater detail below in connection with FIGS. 5 and 6.

The visor 20 can be moved from a raised stored position adjacent the vehicle headliner 14, as shown in FIG. 1, to a lowered windshield sun-blocking position, as shown in FIG. 2, adjacent the rearview mirror 13, also typically mounted to the windshield 16 or alternatively to the edge of the vehicle roof 12 adjacent windshield 16. The visor 20 may include a covered illuminated vanity mirror assembly 22 of the type disclosed in U.S. Pat. No. 5,685,629, which allows the vehicle operator to use the vanity mirror contained in the visor under low ambient light conditions. Visor 20 can be pivoted, using the visor mounting assembly 30, from a front windshield sun-blocking position, as shown in FIG. 2, around the A-pillar 17 of the vehicle to a side window sun-blocking position, as seen in FIG. 3.

Figure 4:
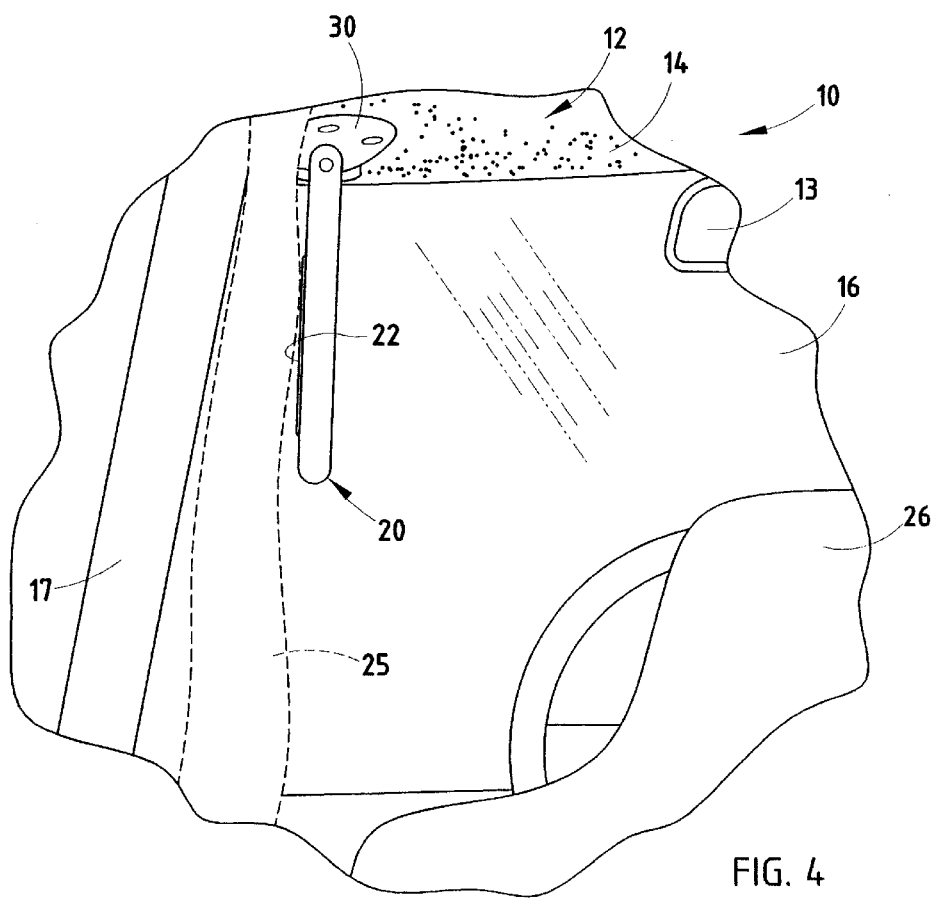
FIG. 4 is an enlarged end elevational view of the visor as shown in FIG. 3, shown with a side curtain air bag in a deployed position in phantom form.

Many vehicles include a side curtain air bag, which is mounted in the headliner 14 in the area adjacent side window 15. With such an installation, the possibility exists that a visor could be positioned to block the deployment of the side curtain air bag or otherwise interfere with its proper operation. The visor mounting assembly 30 of the present invention prevents or greatly reduces such a possibility and allows the side curtain air bag, such as illustrated in phantom lines as element 25 in FIG. 4, to deploy in apposition adjacent the driver seat 26. As seen in FIG. 4, the vertical zone below the headliner 14 is clear to allow deployment of the side curtain air bag. Although the driver's side is shown in FIGS. 1–4, it is to be understood that the visor assembly of the present invention can be used on either one or both of the driver and passenger sides of a vehicle. The details of the visor pivot rod and torque control are not shown in detail but can be of a construction as disclosed in U.S. Pat. No. 4,569,552, which utilizes a torque spring clamp of the type disclosed in U.S. Pat. No. 4,500,131. The visor mounting assembly 30 is now described in detail with reference to FIGS. 5 and 6.

The visor mounting assembly 30 (FIGS. 5 and 6) includes a visor rod 32 having facets 34 which cooperate with the torque fitting for allowing the visor to be held in a detented stored position, as shown in FIG. 1, and to rotate downwardly to a two-way use position, as shown in FIGS. 2–4.

The visor rod 32 is generally L-shaped including a tip end 36, which extends upwardly through a mounting bracket 50 which, in turn, is secured to the vehicle roof 12 by a plurality of fastening screws 56. The visor rod 32 is surrounded at the junction of tip 36 and the generally horizontally extending end 33 of visor rod 32 by an elbow 40 made of a suitable polymeric material, such as polycarbonate or a thermoplastic resin, which is injection molded over rod 32.

The elbow 40 includes a first section 42 which extends from the edge of the visor and provides a decorative appearance to the junction of the visor to the mounting bracket 50 and a collar section 44 which cooperates with bracket 50 by including either projections, such as 45 and 46 extending upwardly from upwardly facing annular surface 43 of collar 44 or recesses which, as will be described below, provide the similar detent function between the elbow 40 and the mounting bracket 50. Elbow 40 includes a conical or cylindrical upwardly extending integral extension 47 which communicates with a mating socket 57 of bracket 50 for providing a desired rotational torque. Integrally formed on an outer surface of collar section 44 is an upwardly extending tab 48 defining a stop which cooperates with an arcuate slot 58 (FIG. 6) in bracket 50 as described below to limit the range of rotation of visor 20 from the windshield to the side window position.

End 36 of visor rod 32 extends through the opening 57 of bracket 50 and a compression spring 58 surrounds tip 36 of visor rod 32 and is held in place by a conventional locking nut 59 force-fitted over the tip end 36 of visor rod 32 in a conventional manner or by a conventional taumeling process. Spring 58 provides a holding force which secures pivot rod 32 to mounting bracket 50 and yet allows the seating and unseating action of projections 45 and 46 of elbow 40 with respect to bracket 50 to detent the visor from the forward position shown in FIG. 2 to the side window position shown in FIGS. 3 and 4.

Mounting bracket 50, in addition to including a conically tapered or cylindrical central opening 57, includes a circular recess 54 (FIG. 6) for receiving collar section 44 of elbow 40 therein, which recess includes a floor 55 having spaced opposed recesses 51 and 52 and slot 58. Recesses 51 are aligned on opposite sides of aperture 57 to receive projections 45, 46 of collar 44 for the detent positioning of the visor in a front windshield position as shown in FIGS. 1 and 2. Recesses 52 are angularly positioned approximately 90° from recesses 51 to position the visor in a detented side window position, as shown in FIGS. 3 and 4, allowing deployment of the side curtain air bag 25. The angular relationship, therefore, of the detents 51 and 52 depend upon the design of a particular vehicle. In some cases, the proper alignment of the visor in the side window position may be greater or less than 90° and a typical range will be from about 80° to about 110° depending upon the geometry of the vehicle. Slot 58 has end walls 59 and 60 which are selectively engaged by tab 48 on elbow 40 to define stops for the excursion of visor 20 about a vertical axis of end 36 of visor rod 32. Slot 58 typically will have an arcuate length corresponding to or closely related to the spacing between recesses 51 and 52 (i.e., from about 80° to about 110° depending upon the vehicle). In some embodiments, only a single pair of recesses 51, 52 and projections 45, 46 (or multiple as required) may be employed to define the cam structure between elbow 40 and bracket 50 for locating the visor.

Bracket 50 further includes mounting apertures 53 for receiving fastening screws 56 for securing the mounting bracket 50 to the vehicle roof. Mounting bracket 50, like elbow 40, may be integrally molded of a suitable polymeric material, such as polycarbonate, thermoplastic resin, or other suitable materials, or cast of a metal, such as an aluminum alloy. In place of employing projections 45 and 46 on collar 44, collar 44 may include recesses which cooperate with spaced projections formed in the floor 55 of recess 54 of mounting bracket 50. With either construction, the visor will be positively urged to and detent in a front windshield position and a side window position which locates the visor in an area which does not interfere with the deployment of the side curtain air bag 25, as seen in FIG. 4. In a preferred embodiment, the arcuate excursion of the visor is limited by the stop defined by tab 48 and slot 58.

It will become apparent to those skilled in the art that various modifications to the preferred embodiment of the invention as described herein can be made without departing from the spirit or scope of the invention as defined by the appended claims.

The invention claimed is:

1. A visor mounting assembly for mounting a visor to a vehicle having a side window curtain air bag, said visor movable between a windshield position and a side window position which permits deployment of the side window curtain air bag comprising:

the visor;

the side window curtain air bag adapted to be mounted to the vehicle above a side window;

a visor pivot rod having an elbow, said visor mounted to said pivot rod; and a mounting bracket for attaching said elbow to the vehicle, said elbow and mounting bracket coupled to one another for providing a detented location for said visor when in the side window position to locate the visor in a position allowing deployment of said side window curtain air bag when said visor is moved to the side window position.

2. A visor mounting assembly for mounting a visor to a vehicle for movement between a windshield position and a side window position comprising:

a visor pivot rod having an elbow; and a mounting bracket for attaching, said elbow to the vehicle, said elbow and mounting bracket coupled to one another for providing a detented location for the visor when in the side window position to locate the visor in a position allowing deployment of a side curtain air bag, wherein said mounting bracket includes a recess formed therein, said recess including an annular recess defining a floor in said mounting bracket and wherein said floor includes one of a recess and a projection.

3. The assembly as defined in claim 2 wherein said elbow includes a section extending into said recess of said mounting bracket and a collar extending into said annular recess of said mounting bracket, said collar including said one of a projection and recess cooperating with the other one of said recess and projection of said mounting bracket for positioning the visor at a predetermined location to allow deployment of the side curtain air bag of the vehicle.

4. The assembly as defined in claim 3 wherein said collar is integrally formed with said elbow.

5. The assembly as defined in claim 4 wherein said elbow is molded to said pivot rod.

6. The assembly as defined in claim 5 wherein said collar includes a pair of opposed projections on opposite sides of said pivot rod.

7. The assembly as defined in claim 6 wherein said mounting bracket includes at least a pair of opposed recesses for receiving said opposed projections of said collar.

8. The assembly as defined in claim 7 wherein said mounting bracket includes generally orthogonally positioned recesses for detenting the visor in first and second spaced-apart angular positions.

9. A visor mounting assembly for mounting a visor to a vehicle having a side window curtain air bag, said visor movable between a windshield position and a side window position allowing deployment of the side window curtain air bag comprising:

the visor;

the side window curtain air bag adapted to be mounted to the vehicle above a side window;

a visor pivot rod having an elbow, said visor mounted to said pivot rod; and a mounting bracket for attaching said elbow to the vehicle, said elbow and mounting bracket coupled to one another for allowing deployment of said side window curtain air bag including a tab on one of said elbow and bracket and an arcuate slot in the other of said elbow and bracket for defining a stop limiting the rotational movement of said visor pivot rod and visor mounted thereto to allow deployment of said side window curtain air bag when said visor is moved to the side window position.

10. A visor assembly for use with a vehicle having a side curtain air bag comprising:

a visor body having a pivot rod assembly mounted thereto, said pivot rod assembly including a pivot rod with an elbow; and a mounting bracket for receiving said elbow, wherein said mounting bracket includes a conical recess formed therein having an annular recess defining a floor, wherein said floor includes one of a recess and projection, said elbow includes a conical section extending into said conical recess of said mounting bracket, said elbow further including a collar extending into said annular recess of said mounting bracket, said collar including the other of a projection and recess cooperating with said one of said recess and projection of said mounting bracket for positioning the visor at a predetermined location to allow deployment of the side curtain air bag of the vehicle.

11. The assembly as defined in claim 10 and further including a stop extending between said elbow and said mounting bracket for limiting the relative movement of said visor pivot rod.

12. The assembly as defined in claim 11 wherein said elbow is molded to said pivot rod.

13. The assembly as defined in claim 12 wherein said collar is integrally formed with said elbow.

14. The assembly as defined in claim 13 wherein said collar includes a pair of opposed projections on opposite sides of said pivot rod.

15. The assembly as defined in claim 14 wherein said mounting bracket includes at least a pair of opposed recesses for receiving said projections of said collar.

16. The assembly as defined in claim 15 wherein said mounting bracket includes generally orthogonally positioned recesses for detenting the visor in first and second spaced-apart angular positions.

17. The assembly as defined in claim 16 wherein said elbow is molded of a polymeric material.

18. The assembly as defined in claim 10 and further including a tab on said elbow and an arcuate slot in said bracket for defining a stop limiting the rotational movement of said visor pivot rod.

19. A visor for movement between a windshield position and a side window position in a vehicle having a side curtain air bag comprising:

a visor body with a pivot rod having an elbow extending therefrom; and a mounting bracket for attaching said elbow to the vehicle, said elbow and mounting bracket coupled to one another with a cam for locating the visor in the side window position allowing deployment of a side curtain air bag, wherein said cam is defined by at least one projection on one of said elbow and mounting bracket, and at least one recess formed in the other of said elbow and mounting bracket and located to cooperate with one another to detent the visor in a predetermined side window position, and wherein said mounting bracket includes a conical recess formed therein having an annular recess defining a floor in said bracket and wherein said floor includes one of a recess and a projection.

20. The visor as defined in claim 19 wherein said elbow includes a conical section extending into said conical recess of said mounting bracket and a collar extending into said annular recess of said mounting bracket, said collar including said one of a projection and recess cooperating with the other one of said recess and projection of said mounting bracket for positioning the visor at said predetermined location to allow deployment of the side curtain air bag of the vehicle.

21. The visor as defined in claim 20 wherein said collar is integrally formed with said elbow.

22. The visor as defined in claim 21 wherein said collar includes a pair of opposed projections on opposite sides of said pivot rod.

23. The visor as defined in claim 22 wherein said mounting bracket includes at least a pair of opposed recesses for receiving said projections of said collar.

24. The assembly as defined in claim 18 and further including a stop extending between said elbow and said bracket for limiting the relative movement of said visor pivot rod.

25. The assembly as defined in claim 18 and further including a tab on said elbow and an arcuate slot in said bracket for defining a stop limiting the rotational movement of said visor pivot rod.

* * * * *